United States Patent Office 3,839,394
Patented Oct. 1, 1974

3,839,394
PROCESS FOR THE PREPARATION OF SUBSTITUTED DINITROPHENYL CHLOROFORMATES
Jean-Paul Konrat, Vert-le-Petit, and Louis Le Roux, Sorgues, France, assignors to Societe Nationale des Poudres et Explosifs, Paris, France
No Drawing. Filed Mar. 1, 1971, Ser. No. 119,938
Claims priority, application France, Mar. 2, 1970, 7007323
Int. Cl. C07c 79/28
U.S. Cl. 260—463     7 Claims

ABSTRACT OF THE DISCLOSURE

Novel substituted dinitrophenyl chloroformates, corresponding to the formula:

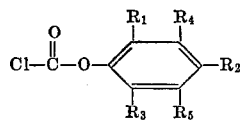

wherein two of the substituents $R_1$, $R_2$ and $R_3$ are nitro groups and the third is a hydrogen or a halogen atom or an alkyl, $R_4$ and $R_5$ are each hydrogen atoms or an alkyl radical. These compounds are prepared by a process wherein phosgene is reacted with the correspondingly substituted alkali metal dinitrophenate at a temperature above 10° C. The alkali metal dinitrophenate must be rigorously anhydrous.

BACKGROUND OF THE INVENTION

Field of the Invention

The present invention relates to novel substituted dinitrophenyl chloroformates and a process for producing same.

Prior Art

Two conventional processes are customarily used for the synthesis of aromatic chloroformates:

by one of these processes, phosgene is made to react with phenol by using a tertiary amine as a hydrochloric acid acceptor;

by the second process a solution of phosgene is made to react in an inert solvent with an aqueous solution of sodium phenoxide.

However, these two conventional processes are not applicable to the preparation of dinitrophenyl chloroformates, in fact the reactivity of the corresponding chloroformate has been found to increase greatly through the presence of two nitro groups in the ortho or para positions of the aromatic nucleus: in the first conventional process, chloroformate decomposition is very strongly catalyzed through the presence of the amine or its hydrochloride (always partially soluble in the phosgenation solvent; it is then impossible to isolate a chloroformate having a satisfactory degree of purity and a very impure oil is obtained; in the second conventional process which is nevertheless used very widely in the synthesis of aryl chloroformates, dinitrophenyl chloroformates react with water and one is left again with the original phenol.

SUMMARY OF THE INVENTION

The invention is a process for preparing optionally substituted dinitrophenyl chloroformates of the formula:

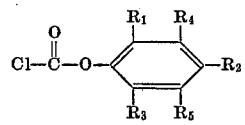

wherein any two of the groups $R_1$, $R_2$, and $R_3$ are nitro groups and the other is hydrogen, halogen or an alkyl radical; and $R_4$ and $R_5$ are each hydrogen or an alkyl radical.

According to the process, phosgene is reacted with a substituted alkali metal dinitrophenate of the formula:

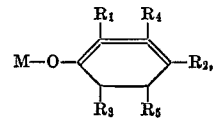

wherein M is an alkali metal such as sodium, and $R_1$, $R_2$, $R_3$, $R_4$ and $R_5$ are as defined above. It is essential that the alkali metal dinitrophenate be extremely anhydrous. The reaction is effected at a temperature above 10° C. and with a phosgene excess of at least 10% above the theoretical amount.

DETAILED DESCRIPTION OF THE INVENTION

According to the present invention there is provided a new process for preparing optionally substituted dinitrophenyl chloroformates, corresponding to the formula:

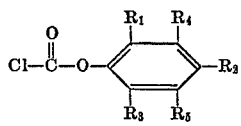

wherein any two of the substituents $R_1$, $R_2$, and $R_3$ are nitro groups and the third is a hydrogen atom, a halogen atom or an alkyl radical; and $R_4$ and $R_5$ each are a hydrogen atom or an alkyl radical.

The term "alkyl" as used herein denotes a straight or branched chain alkyl radical having from 1 to 4 carbon atoms.

This process allows the isolation, in good yield, of pure, stable dinitrophenyl chloroformates in the crystallized state, something which had not been done and which was not possible with the chloroformate preparation processes previously known.

The invention also relates to novel dinitrophenyl chloroformates in the pure, crystalline state corresponding to the formula given above.

The chloroformates of the invention are intermediate compounds which can be used in the manufacture of the corresponding carbonates or carbamates which are used as herbicides or fungicides in agriculture.

The action of alcohols on the chloroformates leads to the corresponding carbonates, and the action of primary and secondary amines on the chloroformates gives the corresponding carbamates.

For example, 2,4-dinitrophenyl chloroformate by reaction with n-octyl alcohol enables the corresponding composite carbonate, which is a well known ascaricide, to be obtained.

It has now been found possible to prepare optionally substituted dinitrophenyl chloroformates which are capable, at the same time of being isolated in the pure crystallized state and of being stored indefinitely, by the action of phosgene on alkali metal dinitrophenates, provided the following working conditions are observed:

1. use must be made of an alkali metal dinitrophenate and not a tertiary amine as an acid acceptor, since impure and unstable products are obtained in the latter case;
2. the alkali metal dinitrophenate must be strictly anhydrous and not merely "dried"; it is fact known that dinitrophenates nearly always form a hydrate whose decomposition temperature is comparatively high. For example, sodium 2,4-dinitrophenate forms a hydrate with water whose decomposition temperature is 120° C.; likewise, sodium dinitro-ortho-sec.-butylphenate forms a yellow crystallized hydrate whose decomposition temperature is 1250 C.; the dehydrated product is orange-red. A simple stove-drying at 60–100° C. does not therefore permit dehydrating the product. With an imperfectly dehydrated alkali metal dinitrophenate, the reaction which takes place at 0° C. leads to a very impure, oily final product, whereas with a strictly anhydrous dinitrophenate, no reaction occurs at 0° C.;
3. phosgenation is preferably effected in a slightly ionizing inert solvent such as methylene chloride, chloroform, chlorobenzene, benzene or toluene, since the chloroformate is only moderately stable in acetonitrile or dimethylsulphoxide;
4. phosgenation must be effected at a temperature above 10° C. Below that temperature (around 0° C. for example) the reaction is practically negligible.

Further, it is preferable to work with a slight excess of phosgene, at least 10% of the theoretical amount, so as to obtain better yields.

It is possible to conduct the reaction without solvent in suspension in excess liquid phosgene, provided the reaction is carried out in a closed vessel.

The chloroformates thus obtained are pure products, properly crystallized and stable. They can be stored indefinitely and transported in that condition, provided they are maintained in a strictly anhydrous environment.

They undergo the conventional chloroformate reactions, such as acting on alcohols to produce composite carbonates and on primary and secondary amines to produce carbamates.

The invention is illustrated by the following non-limitative examples:

EXAMPLE 1

Dinitro-2,4-phenyl chloroformate

Sodium 2,4-dinitrophenate is first prepared by reacting soda with dinitrophenol it is then completely dried by placing it in suspension in chlorobenzene and distilling the chlorobenzene until no more water passes from the suspension.

The residual solvent is removed by reverse filtration and the solid is washed several times with dry methylene chloride and then stored in suspension in this solvent.

In a well-shaken round-bottomed flask a stock solution of 300 g. of phosgene in 300 cc. of methylene chloride is prepared. The solution is kept at approximately 0° C. Then, 103 g. (0.5 mole) of the anhydrous sodium dinitrophenate prepared above is suspected in the methylene chloride solution. No reaction is seen. Slowly the temperature is raised, and from around 10° C., the reaction starts off gently and the precipitate gradually changes color going from yellow to brown.

After two hours, the suspension is filtered and washed with methylene chloride over a strainer. The obtained precipitate consists of 97% sodium chloride.

The filtrate is degasified and evaporated under vacuum.

In this way, 100 g. of 2,4-dinitrophenyl chloroformate is obtained in crystallized form having a chlorine content of approximately 13% (yield: 80%). Recrystallizing in methylene chloride gives 73 g. of pure chloroformate (M.P.: 57.4° C.) with a chlorine content of 14.17% (theoretical chlorine content: 14.4%).

The infrared spectrum shows the characteristic absorption bands at 1785–1070 cm.$^{-1}$.

Elemental analysis of the crystals gives the following results: Cl, 14.2%; C, 34.4%; H, 1.5%; N, 11.2%; O, 39.3%.

This purified and crystallized chloroformate shows excellent stability, it can be stored indefinitely at ordinary temperature and if heated to 130° C. in the molten state or in solution in orthodichlorobenzene for 7 hours no considerable decomposition is observed.

EXAMPLE 2

Preparation of 2,4-dinitrophenyl chloroformate without phosgene excess

As in the foregoing example rigorously anhydrous sodium dinitrophenate is prepared.

In a round-bottomed flask a stock solution of 70 g. of phosgene in 530 cc. of anhydrous toluene (0.72 mole) is prepared. The solution is kept at 0° C. then 150 g. of anhydrous sodium dinitrophenate (0.72 mole) is added after which, the mixture is left standing to return to room temperature; the mixture changes color.

After four hours, the sodium chloride is removed, the solution is degasified, the solvent is evaporated and the obtained crystal is recrystallized; in this way a chloroformate of 97.6% purity with a yield of 53% is obtained.

EXAMPLE 3

Preparation of 2,4-dinitrophenyl chloroformate without solvent 200 g. of liquid phosgene and 30 g. of anhydrous sodium dinitrophenate are placed into a 500 cc. enameled autoclave. The autoclave is closed and allowed to return to room temperature while agitating it regularly. After three hours the autoclave is cleared of all the phosgene.

The solid residue is dissolved in methylene chloride which is filtered to remove the sodium chloride. The methylene chloride is evaporated to obtain dinitrophenyl chloroformate of m.p. 57.3° C. in 85% yield.

EXAMPLE 4

2,6-dinitrophenyl chloroformate

Sodium 2,6-dinitrophenate is dehydrated by entraining the water through distillation of orthodichlorobenzene.

In a round-bottomed flask under agitation, a stock solution of 3 moles of phosgene (approximately 300 g.) in 300 cc. of methylene chloride is prepared. The solution is kept at about 0° C.

Then 0.5 mole dehydrated sodium 2,6-dinitrophenate prepared as above is introduced to the solution to form a suspension. No reaction is observed. Then the temperature is allowed to rise gradually.

From 15° C. on, a reaction occurs and the precipitate changes color.

The mixture is agitated for 12 hours at room temperature, then the suspension is filtered and the sodium chloride is washed with methylene chloride. The filtrate is degasified and evaporated under vacuum.

In this way 2,6-dinitrophenyl chloroformate is obtained in crystallized form (m.p. 87.4° C.) in a 91.5% yield; the chlorine content of the product is 14.23% (theoretical amount 14.4%).

EXAMPLE 5

4,6-dinitro-orthocresyl chloroformate

Sodium dinitro-orthocresolate is prepared by drying the hydratetd sodium salt under vacuum at 130° C.

In a round-bottomed flask under agitation, a solution of 3 moles of phosgene (approximately 300 g.) in 300 cc. of methylene chloride is prepared and maintained at around 0° C. Then, 0.5 mole of dehydrated sodium 2,6-dinitrophenate prepared according to the method described above is suspended in the methylene chloride. No reaction is noted. Then the temperature is allowed to rise slowly.

The reaction starts after reaching 10° C. and the precipitate changes color.

The mixture is agitated for 12 hours at room temperature, and then the suspension is filtered. The sodium chloride precipitate is washed with methylene chloride. The filtrate is then degasified and evaporated under vacuum.

In this way, a yield of 85% of 4,6-dinitro-orthocresyl chloroformate (m.p. 76.2° C.) is obtained with a chlorine content of 13.51 (theoretical amount 13.65%).

EXAMPLE 6

4,6-dinitro-2-chlorophenyl chloroformate

Sodium 4,6-dinitro-2-chlorophenate is dehydrated by entraining the water through distillation of orthodichlorobenzene.

In a round-bottomed flask under agitation, a stock solution of 3 moles of phosgene (approximately 300 g.) in 300 cc. of methylene chloride is prepared, and kept at around 0° C.

Then, 0.5 mole of dehydrated sodium 2,6-dinitrophenate prepared according to the method described above is suspended in the methylene chloride. No reaction is observed. Then the temperature is allowed to rise slowly.

The reaction starts only at above 25° C. and the precipitate changes color.

The mixture is agitated for 12 hours at room temperature, then the suspension is filtered and the sodium chloride precipitate is washed with methylene chloride. The filtrate and washings are combined and degasified and evaporated under vacuum.

In this way, an 83.3% yield of 4,6-dinitro-2-chlorophenyl chloroformate is obtained. Recrystallization gives a product whose melting point is 58° C. and purity 98%.

EXAMPLE 7

2,6-dinitro-4-methylphenyl chloroformate

Sodium 2,6-dinitro-paracresolate is dehydrated by entraining the water through distillation of orthodichlorobenzene.

In a round-bottomed flask under agitation, a stock solution of 3 moles of phosgene (approximately 300 g.) in 300 cc. of methylene chloride is prepared and kept at a temperature around 0° C. Then, 0.5 mole of dehydrated sodium 2,6-dinitrophenate is suspended in the methylene chloride. No reaction is observable. Then the temperature is allowed to rise slowly.

The reaction starts at around 15° C. and the suspension changes its appearance.

In this way, the crystallized 2,6-dinitro-4-methylphenyl chloroformate is obtained in an 86% yield. After one recrystallization a solid of 99% purity and melting at 118° C. is obtained.

The following examples are intended to demonstrate the critical character of the working conditions described above.

EXAMPLE 8

The preparation of dinitro-orthocresyl chloroformate by reaction of phosgene and dinitro-orthocresol in the presence of tertiary amine does not lead to a product of satisfactory quality. Thus, into a round-bottomed flask are placed 250 cc. of anhydrous toluene and 200 g. of dinitro-orthocresol, which is cooled to 0° C. then 120 g. of phosgene are added.

Now, 121 g. of dimethylaniline are dropped, producing a brisk exothermic reaction. The mixture is cooled to maintain the temperature between 10 and 15° C. The formed hydrochloride is filtered off, and the toluene is degasified and evaporated. In this way 230 g. of an oily product is obtained which decomposes in the course of time and whose chlorine content is 8.6% (Theoretically: 13.6%).

EXAMPLE 9

In a round-bottomed flask, a stock solution of 70 g. phosgene in 530 cc. of anhydrous toluene is prepared and kept at 0° C. Then, 150 g. of anhydrous sodium 2,4-dinitrophenate (which has been dehydrated by entrainment of the water through distillation of chlorobenzene) is added. No apparent reaction is observable in the reaction mixture kept at 0° C., nor any liberation of heat or any change in appearance.

The suspension is agitated at 0° C. for 7 hours without any change in its appearance.

Then the precipitate is filtered and is found to consist mainly of the sodium dinitrophenate starting material.

The filtrate is degasified, then the toluene is evaporated under vacuum at 50° C., giving 6 grams of an impure, oily product with a 12.3% chlorine content titer. (Assuming that the hydrolyzable chlorine recovered during the analysis corresponds entirely to chloroformate, the transformation yield is seen to be 17% at the maximum after 7 hours of phosgenation.)

Thus, the phosgenation reaction of anhydrous sodium dinitrophenate is negligible at 0° C.

EXAMPLE 10

In a round bottomed flask, a stock solution of 70 g. phosgene in 530 cc. anhydrous toluene is prepared and kept at 0° C. Then, 150 g. of sodium dinitrophenate which has been merely stove-dried at 100° C. (despite the perfectly dry aspect of the yellow powder thus obtained, it is known to be a hydrate since a temperature of at least 120° C. is necessary for removing the water molecule from the sodium dinitrophenate hydrate) is added to the solution.

As soon as the addition of this dinitrophenate is begun, at 0°, an exothermic reaction is seen to develop requiring strenuous chilling of the mixture. When the whole of the product has been introduced and the reaction is completed, the precipitate is filtered. The phosgene is driven off, and the toluene is distilled out, 120 g. of an oil whose chlorine content is very low (5%) are obtained and from this oil it is impossible to isolate the chloroformate in the crystallized state.

Thus the use of sodium dinitrophenate which has not been rigorously and completely made anhydrous does not lead to a good-quality end product.

In the foregoing examples reference has been made to the sodium salt of various dinitrophenates. However, any alkali metal dinitrophenate can be used with equal facility. The sodium salt has been used merely for the sake of convenience and because sodium metal is readily available and relatively inexpensive.

What is claimed is:

1. A process for preparing stable, pure, crystallised substituted dinitrophenyl chloroformates of the formula:

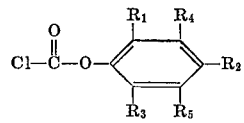

wherein any two of the substituents $R_1$, $R_2$ and $R_3$ are nitro groups and the other is a hydrogen or halogen atom or an alkyl radical; $R_4$ and $R_5$ are each a hydrogen atom or an alkyl radical, said process comprising reacting phosgene with a rigorously anhydrous substituted alkali metal dinitrophenate of the formula:

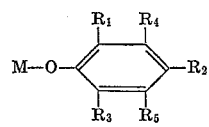

wherein $R_1$, $R_2$, $R_3$, $R_4$ and $R_5$ are as defined above and M is an alkali metal at room temperature, said phosgene being in excess of the theoretical amount, said alkali metal dinitrophenate being previously dried by azeotropic distillation and isolating the product from the reaction mixture.

2. A process as claimed in claim 1 comprising adding the substituted alkali metal dinitrophenate to liquid phosgene, without solvent, in a closed vessel.

3. A process as claimed in claim 1 comprising adding the substituted alkali metal dinitrophenate to a solution of phosgene in an inert, nonionizing solvent, to form a precipitate of alkali metal chloride, filtering off said precipitate to obtain a filtrate including the substituted dinitrophenyl chloroformate and evaporating the filtrate.

4. A process as claimed in claim 3 wherein the solvent is methylene chloride, chloroform, benzene or toluene.

5. A process as claimed in claim 4 wherein the solvent is methylene chloride or toluene.

6. A process as claimed in claim 1 wherein the substituted alkali metal dinitrophenate is a substituted sodium dinitrophenate.

7. A process as claimed in claim 1 wherein the excess of phosgene is at least 10%.

References Cited

UNITED STATES PATENTS

| | | | |
|---|---|---|---|
| 3,198,824 | 8/1965 | Vanden Boogaart | 260—463 |
| 3,655,717 | 4/1972 | Becher et al. | 260—463 |
| 3,130,037 | 4/1964 | Scherer et al. | 71—2.6 |
| 3,017,424 | 1/1962 | Meyer et al. | 260—463 |

FOREIGN PATENTS

| | | |
|---|---|---|
| 955,817 | 4/1964 | Great Britain. |
| 941,709 | 11/1963 | Great Britain. |
| 212 | 1/1968 | Japan. |

OTHER REFERENCES

Noller, The Chemistry of Organic Compounds, 3rd ed., W. B. Saunders Co., Philadelphia, pp. 332–3 (1965).

LEWIS GOTTS, Primary Examiner

D. G. RIVERS, Assistant Examiner

U.S. Cl. X.R.

260—621 P